US012632224B2

(12) United States Patent
Zhang et al.

(10) Patent No.: US 12,632,224 B2
(45) Date of Patent: May 19, 2026

(54) METHOD FOR RUNNING INSTANCE, COMPUTER DEVICE, AND STORAGE MEDIUM

(71) Applicant: BOOMING TECHNOLOGY (HANGZHOU) CO., LTD., Hangzhou (CN)

(72) Inventors: Zhidong Zhang, Hangzhou (CN); Shanshan Wang, Hangzhou (CN); Zeyu Liu, Hangzhou (CN)

(73) Assignee: BOOMING TECHNOLOGY (HANGZHOU) CO., LTD., Hangzhou (CN)

( * ) Notice: Subject to any disclaimer, the term of this patent is extended or adjusted under 35 U.S.C. 154(b) by 260 days.

(21) Appl. No.: 18/472,488

(22) Filed: Sep. 22, 2023

(65) Prior Publication Data

US 2024/0111496 A1 Apr. 4, 2024

(30) Foreign Application Priority Data

Sep. 23, 2022 (CN) .......................... 202211168043.1

(51) Int. Cl.
*G06F 8/33* (2018.01)
*G06F 8/34* (2018.01)

(52) U.S. Cl.
CPC . *G06F 8/33* (2013.01); *G06F 8/34* (2013.01)

(58) Field of Classification Search
CPC ..................................... G06F 8/33; G06F 8/34
USPC .................................................. 717/110–113
See application file for complete search history.

(56) References Cited

U.S. PATENT DOCUMENTS

| | | | | |
|---|---|---|---|---|
| 8,202,167 B2 * | 6/2012 | Ackley | ................... | A63F 13/45 |
| | | | | 463/31 |
| 9,870,060 B2 * | 1/2018 | Marggraff | ............... | G06F 3/017 |
| 2012/0021827 A1 | 1/2012 | Raitt | | |

FOREIGN PATENT DOCUMENTS

| | | |
|---|---|---|
| CN | 104267963 A | 1/2015 |
| CN | 106293761 A | 1/2017 |
| CN | 110675466 A | 1/2020 |
| CN | 111930290 A | 11/2020 |

(Continued)

OTHER PUBLICATIONS

Lindberg, "Scene Editing and ECS Conversion", 2019, Undefined Games, retrieved from https://www.undefinedgames.org/2019/11/01/scene-editing-and-ecs-conversion/ , 12 pages. (Year: 2019).*

(Continued)

*Primary Examiner* — Ted T. Vo
(74) *Attorney, Agent, or Firm* — Kolitch Romano Dascenzo Gates LLP

(57) ABSTRACT

A method for running an instance is provided. The method includes: acquiring a component composing an instance, wherein the component is established based on an ECS architecture, and the instance is an edited unit in a game scene editor; acquiring, during a running phase of the instance, a running parameter of the component by converting an editor parameter in the component through the game scene editor, wherein a process of the converting is determined according to a data structure of a parameter used by a game engine in a case of running the instance; and running the instance through the game engine based on the component and the running parameter.

15 Claims, 9 Drawing Sheets

Acquiring a component composing an instance

302

Acquiring, during a running phase of the instance, a running parameter of the component by converting an editor parameter in the component through the game scene editor

304

Running the instance through the game engine based on the component and the running parameter

306

(56) References Cited

FOREIGN PATENT DOCUMENTS

| | | | |
|---|---|---|---|
| CN | 112704872 A | 4/2021 |
| CN | 112785697 A | 5/2021 |

OTHER PUBLICATIONS

Colson, "How to make a simple entity-component-system in C++", 2020, retrieved from https://www.david-colson.com/2020/02/09/ making-a-simple-ecs.html , 13 pages. (Year: 2020).*
Beckmann et al., "Shortening Feedback Loops in a Live Game Development Environment", 2021, IEEE, 5 pages. (Year: 2021).*
RuntimeCube, [Unity ECS] GameObject Transform and Sub-Scenes, https://blog.csdn.net/u013716859/article/details/ 122020806; Dec. 19, 2021.

* cited by examiner (a)

(b)

801

| | |
|---|---|
| Name | |
| GUID | |

| Transform |
|---|

| Position | | | |
|---|---|---|---|
| Rotation | | | |
| Scale | | | |

| Set |
|---|

| Width | |
|---|---|
| Height | |
| Color | |
| Intensity | |
| Radius | |
| Open shadow | |
| Shadow | |

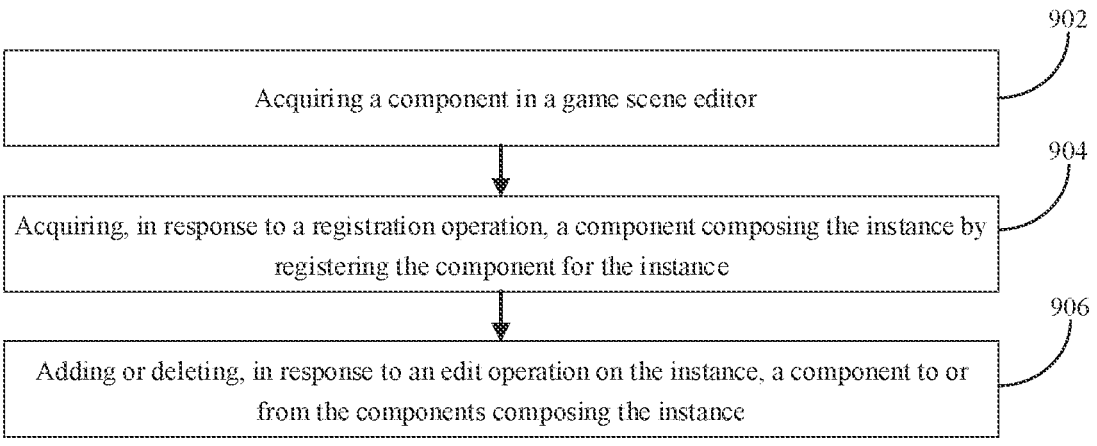

902

Acquiring a component in a game scene editor

904

Acquiring, in response to a registration operation, a component composing the instance by registering the component for the instance

906

Adding or deleting, in response to an edit operation on the instance, a component to or from the components composing the instance

FIG. 9

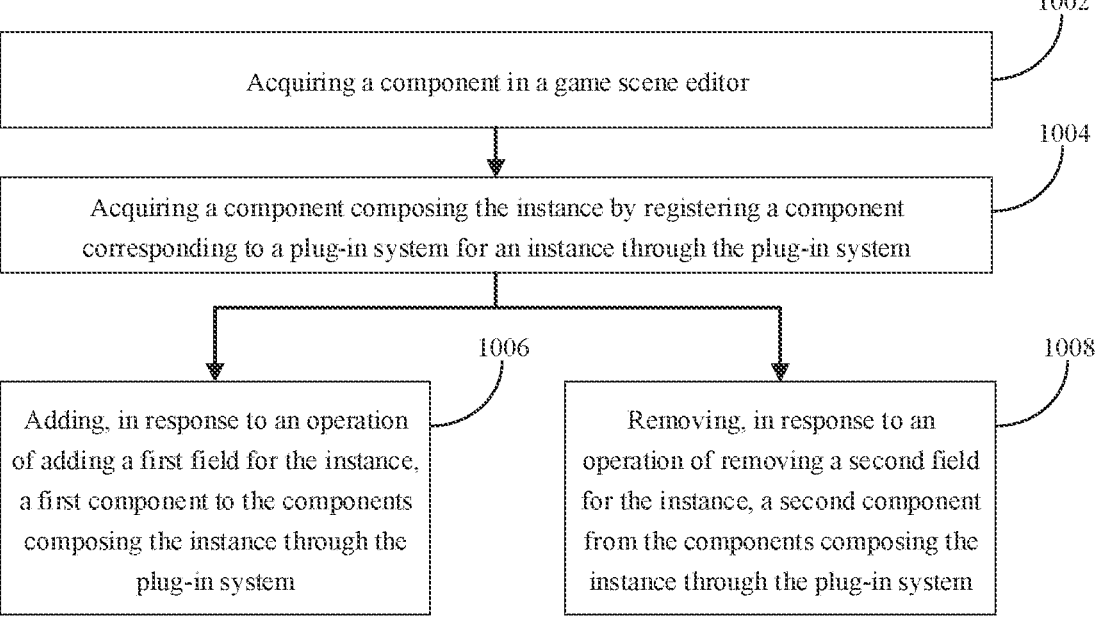

1002

Acquiring a component in a game scene editor

1004

Acquiring a component composing the instance by registering a component corresponding to a plug-in system for an instance through the plug-in system

1006

Adding, in response to an operation of adding a first field for the instance, a first component to the components composing the instance through the plug-in system

1008

Removing, in response to an operation of removing a second field for the instance, a second component from the components composing the instance through the plug-in system

Acquiring Module

1102

Converting module

1103

Running Module

1101

Acquiring Module

1104

Adding Module

1102

Converting module

1103

Running Module

1101

Acquiring Module

1105

Removing Module

1102

Converting module

1103

Running Module

1106

Registering Module

1101

Acquiring Module

1102

Converting module

1103

Running Module

METHOD FOR RUNNING INSTANCE, COMPUTER DEVICE, AND STORAGE MEDIUM

CROSS-REFERENCE TO RELATED APPLICATION

This application is based on and claims priority to Chinese Patent Application No. 202211168043.1, filed on Sep. 23, 2022, the disclosure of which is herein incorporated by reference in its entirety.

TECHNICAL FIELD

The present disclosure relates to the field of computer technologies, and in particular, relates to a method for running an instance, a computer device, and a storage medium.

BACKGROUND

A parameter of an instance in a virtual environment of a game can be edited through a game scene editor, and the parameter is used for indicating a field of the instance. For example, the instance includes a virtual role in the virtual environment of the game, a virtual object composing the virtual environment, and the like. For ease of operation of a user, an editor parameter that is easy for the user to understand is generally provided in the game scene editor. The editor parameter is a parameter used in the case of editing the instance in the game scene editor.

During a running phase of the instance, a game engine runs the instance based on the parameter (i.e. the editor parameter) of the instance. The game engine needs to use an efficient data structure to improve the computational performance and the memory reading speed. A data structure of a running parameter of the instance used by the game engine in the case of running the instance may be different from that of the editor parameter used in the case of editing the instance through the game scene editor.

SUMMARY

The present disclosure provides a method for running an instance, a computer device, and a storage medium. Technical solutions of the present disclosure are as follows.

In one aspect of embodiments of the present disclosure, a method for running an instance is provided. The method includes:

acquiring a component composing an instance, wherein the component is established based on an entity-component-system (ECS) architecture, and the instance is an edited unit in a game scene editor, the game scene editor being configured to edit a virtual environment provided by an application program;

acquiring, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and running the instance through the game engine based on the component and the running parameter.

In another aspect of the embodiments of the present disclosure, a computer device is provided. The computer device includes:

one or more processors, and a memory for storing one or more instructions executable by the processors, wherein the one or more instructions, when loaded and executed by the processors, cause the processors to perform:

acquiring a component composing an instance, wherein the component is established based on an entity-component-system (ECS) architecture, and the instance is an edited unit in a game scene editor, the game scene editor being configured to edit a virtual environment provided by an application program;

acquiring, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and running the instance through the game engine based on the component and the running parameter.

In another aspect of the embodiments of the present disclosure, a non-transitory computer-readable storage medium storing at least one instruction therein is provided. The at least one instruction, when executed by a processor of a computer device, causes the computer device to perform:

acquiring a component composing an instance, wherein the component is established based on an entity-component-system (ECS) architecture, and the instance is an edited unit in a game scene editor, the game scene editor being configured to edit a virtual environment provided by an application program;

acquiring, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and running the instance through the game engine based on the component and the running parameter.

In another aspect of the embodiments of the present disclosure, a computer program product is provided. The computer program product includes at least one computer program, wherein the at least one computer program, when executed by a processor, causes the processor to perform:

acquiring a component composing an instance, wherein the component is established based on an entity-component-system (ECS) architecture, and the instance is an edited unit in a game scene editor, the game scene editor being configured to edit a virtual environment provided by an application program;

acquiring, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and running the instance through the game engine based on the component and the running parameter.

BRIEF DESCRIPTION OF DRAWINGS

FIG. 9 shows a flowchart of a method for editing an instance according to some embodiments of the present disclosure;

FIG. 10 shows a flowchart of a method for editing an instance according to some embodiments of the present disclosure;

DETAILED DESCRIPTION

Figure 1:
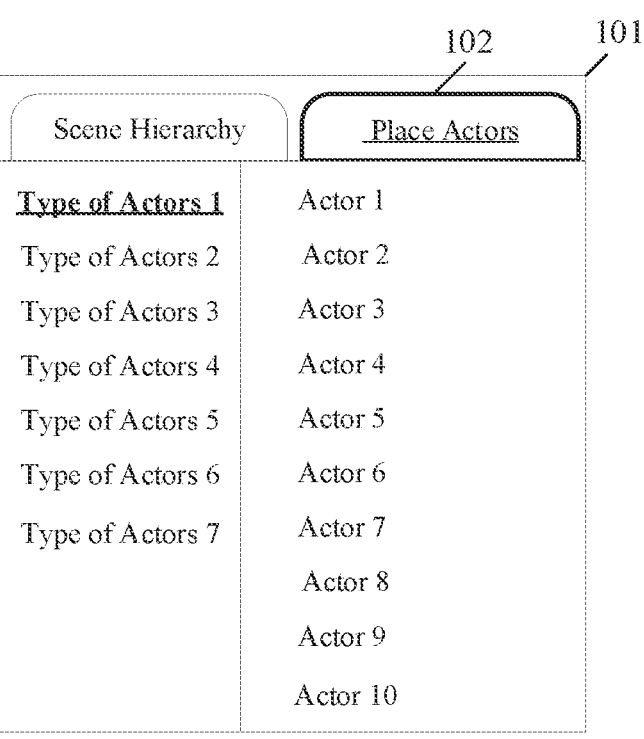
FIG. 1 shows a schematic diagram of a panel of a game scene editor according to some embodiments of the present disclosure.

For clearer descriptions of the objectives, technical solutions, and advantages of the present disclosure, embodiments of the present disclosure are described in detail hereinafter with reference to the accompanying drawings.

The information involved in the present disclosure can be authorized by users or fully authorized by all parties.

First, terms involved in the present disclosure are introduced:

Entity-component-system (ECS): ECS is a game architecture pattern, following the principle of "composition over inheritance". In a game, each basic unit is an entity, each entity consists of one or more components, and a system is employed to process a collection of components. The entity in the ECS may also be referred to as an instance. The components in the ECS are used for composing the entities, and each entity consists of one or more components. The components are used for indicating fields of the entities, for example, an entity "ceiling lamp" includes a "light" component which may endow the "ceiling lamp" with the field of emitting light. Each component corresponds to a plug-in system (also called a system), and each plug-in system corresponds to one or more components and is used for managing its corresponding component and processing data of the component. For example, each plug-in system may register its corresponding component under a certain entity to make the component become one of the components composing the entity to provide the entity with its corresponding field. The plug-in system may also remove its corresponding component from the entity.

Editor: an editor is a software program, generally referring to writing software used for modifying a computer file. Common editors include text editors, web page editors, source program editors, image editors, sound editors, video editors, and the like. The editor in the present disclosure is a game scene editor. The game scene editor is an editor used for editing a virtual environment in a game. The virtual environment consists of one or more virtual scenes, and the game scene editor may be used for editing one of the virtual scenes (such as a level).

Instance: an instance includes a virtual role in the virtual environment of the game, a virtual object composing the virtual environment, and the like. In some embodiments, the instance in the present disclosure refers to an actor in the game scene editor, and the actor is any object that may be placed in the virtual environment (level), such as a camera, a static grid object, or a player (virtual role) starting position.

Object-oriented programming (OOP): OOP is a programming paradigm based on an "object" concept, and may contain data and codes, such as data in a field form (commonly referred to as field) and codes in a process form (commonly referred to as method).

Class: a class is a basis for OOP to implement information encapsulation. The class is a user-defined reference data type and is also referred to as a class type. Each class contains data specification and a set of functions that manipulate data or pass messages. An instance of the class is referred to as an object.

Virtual environment: it refers to a virtual environment displayed (or provided) in response to an application program (game) running on a terminal. The virtual environment may be a simulated environment of the real world, a semi-simulated semi-fictitious environment, or a purely fictitious environment. The virtual environment may be any one of a two-dimensional virtual environment, a 2.5-dimensional virtual environment, and a three-dimensional virtual environment, which is not limited in the embodiments of the present disclosure.

Virtual role: it refers to at least one movable object controlled by a user in the virtual environment. A virtual role may be a virtual character, a virtual animal, a cartoon character, or the like. Optionally, the virtual role is a three-dimensional stereo model created based on an animated skeleton technology. Each virtual role has its own shape and volume in the virtual environment and occupies a part of space in the virtual environment.

It is necessary to place one or more actors in the game scene editor, and the actor may be established (displayed) in a game scene by dragging it into the game scene (virtual scene) edited by the game scene editor. In some embodiments, FIG. 1 shows a schematic diagram of a panel of a game scene editor according to some embodiments of the present disclosure. As shown in FIG. 1, different types of actors and the actors under each type are displayed in the panel 101 displayed on a user interface of the game scene editor in a case where a place actors option 102 is selected. For example, the types of the actors include basic, light, camera, and the like. The actors under the basic type may include box, plane, airwall, path, and the like. Each actor has its own fields, such as position, size, and the like. A conventional OOP pattern, which takes actors as the minimum units (the minimum edited units) in a game scene editor and constructs each actor separately by means of codes, is too complicated and carries too many functions to dynamically add or remove fields for the actors.

Furthermore, parameters of the actors in the game scene can be edited through the game scene editor. For ease of operation of a user, editor parameters that are easy for the user to understand are generally provided in the game scene editor. The editor parameters are parameters used in the case of editing the actors in the game scene editor. During a running phase of the actors, a game engine runs the actors based on the parameters (i.e. the editor parameters) of the actors. Since the game engine requires efficient data structures to improve computational performance and memory reading speed, it is necessary to convert the editor parameters of the actors in the game scene editor into running parameters that are used at the time of running the actors. A data processing logic that converts the editor parameters of the actors into the running parameters is typically defined in a game engine, and converts the parameters by the game engine in the case of running the actors. The game engine needs to take into account a relevant logic in the game scene editor that involves the above parameters while running, so as to make the data processing logic of both sides be coupled, resulting in complicated maintenance of the data processing logic in the game engine.

In the method provided by the embodiments of the present application, the components under the ECS architecture are used to compose the actors, such that dynamic addition or removal of fields for the actors is allowed by adding or removing the component without modifying codes of the actors. And since the fields provided by the component are stored continuously in a memory, the performance is improved. In addition, by converting the editor parameters of the components into the running parameters by the game scene editor, the data processing logic for parameter conversion is realized in the game scene editor, and the effect that all data processing logics related to the editor are placed on the editor's side is realized. The game engine does not need to take into account the data processing logic in the game engine that is related to the actors while running, and is decoupled from the relevant data processing logic of the game scene editor, such that the overall processing logic is lighter and cleaner, the overall running architecture is tidier, the maintenance of the data processing logic in the game engine is avoided, and the complexity of maintaining the data processing logics is reduced.

Figure 2:
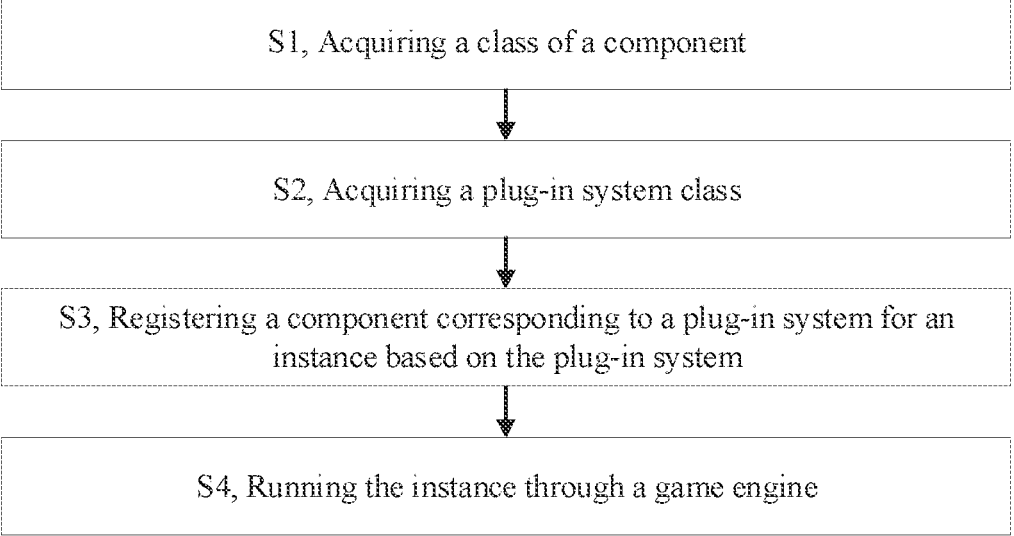
FIG. 2 shows a schematic diagram of a process of registering an instance in a game scene editor according to some embodiments of the present disclosure.

FIG. 2 shows a schematic diagram of a process of registering an instance in a game scene editor according to some embodiments of the present disclosure. As shown in FIG. 1, in S1, a computer device acquires a class of a component, wherein the class of the component includes codes for defining the component, and the component is established based on an ECS architecture.

In S2, the computer device acquires a plug-in system class that includes a code for defining a plug-in system, wherein the plug-in system is established based on the ECS architecture. The plug-in system has a corresponding relationship with the above-mentioned component, and is used for processing data of its corresponding component, that is, for managing its corresponding component. The components managed by different plug-in systems are different. The plug-in system may provide an interface used for adding its corresponding component, and an interface used for removing its corresponding component. A processing function (which may be referred to as a tick function) is also defined in the plug-in system, and a game scene editor of the computer device calls the plug-in system to run the processing function to convert an editor parameter of the component into a running parameter by a game engine in a case of running the component.

In S3, the computer device registers a component corresponding to the plug-in system for an instance based on the plug-in system. The instance consists of the component, and is an edited unit in the game scene editor, such as an actor. The component is the minimum edited unit in the game scene editor.

In S4, the computer device runs the instance through the game engine. In this process, the computer device calls the plug-in system through the game scene editor to run the processing function to convert the editor parameter of the component composing the instance into the running parameter and synchronize the running parameter to the game engine, thereby enabling the game engine to run (render) the instance based on the component and the running parameter obtained through conversion.

By converting the editor parameter of the component into the running parameter through the game scene editor, a data processing logic for parameter conversion is realized in the game scene editor, and the effect that all data processing logics related to the instances are placed on the game scene editor's side is achieved. The game engine does not need to take into account the data processing logic in the game engine that is related to the instance while running, and is decoupled from the relevant data processing logic of the game scene editor, such that the overall processing logic is lighter and cleaner, the overall running architecture is tidier, the maintenance of the data processing logic in the game engine is avoided, and the complexity of maintaining the data processing logics is reduced.

Figure 3:
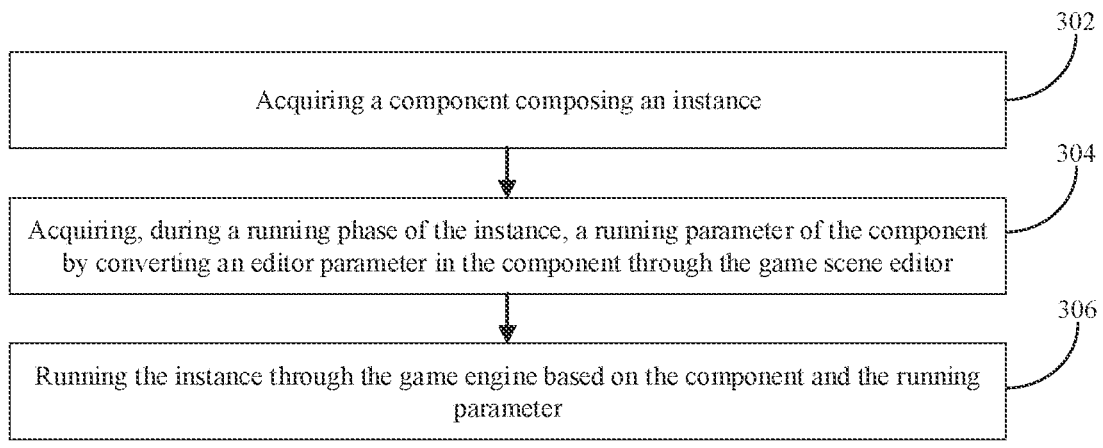
FIG. 3 shows a flowchart of a method for running an instance according to some embodiments of the present disclosure.

FIG. 3 shows a flowchart of a method for running an instance according to some embodiments of the present disclosure. The method may be applied to a computer device. In some embodiments, the computer device is a notebook computer, a handset, a tablet computer, a server, or other terminals. As shown in FIG. 3, the method includes the following processes.

In S302, a component composing an instance is acquired.

The component is established based on an ECS architecture, and refers to a component under the ECS architecture. The instance is an edited unit in a game scene editor, for example, the instance is the minimum edited unit in the game scene editor. In some embodiments, the instance includes a virtual role in a virtual environment of a game, a virtual object composing the virtual environment, and the like. The game scene editor is used for editing a virtual environment provided by an application program, such as an editor that is used for editing game scenes (levels) of a game in a game development process.

In some embodiments, the application program based on the virtual environment may include any of a first-person-shooting (FPS) game, a third-personal-shooting (TPS) game, a multiplayer online battle arena (MOBA) game, a battle arena game, and a simulation game (SLG).

The computer device may acquire the component by acquiring a class of the component. The class of the component includes codes for defining the component. Optionally, the class of the component is written by a developer.

In S304, during a running phase of the instance, a running parameter of the component is acquired by converting an editor parameter in the component through the game scene editor.

The running phase of the instance may also be referred to as runtime. The process of the converting is determined according to a data structure of the parameters used by the game engine in the case of running the instance. Optionally, the data structures of the editor parameter in the component and of the parameters used by the game engine in the case of running the instance are defined by the developer of the game. The editor parameter in the component is a parameter used for editing the component in the game scene editor, and is defined in the class of the component.

In some embodiments, converting the editor parameter in the component into the running parameter includes: converting a field indicated by the editor parameter from being represented by data of a first data structure to being represented by data of a second data structure, wherein the data of the first data structure is the editor parameter, and the data of the second data structure is the running parameter. The first data structure is a data structure that the editor parameter employs to indicate the field, and the second data structure is a data structure that the running parameter employs to indicate the field. The field indicated by the editor parameter and the field indicated by the running parameter have the same content, but the data structures that the editor parameter and the running parameter employ may be different. Furthermore, in the case where the data structure of the editor parameter and the data structure running parameter are identical, the data in the editor parameter may be directly mapped into the running parameter to run the component.

In some embodiments, an editor parameter containing three parameters is employed for indication in editing a spatial position of the instance, while a running parameter containing five parameters is employed for indication in running the instance. The editor parameter containing the three parameters and the running parameter containing the five parameters indicate the same instance position. The process of parameter conversion is a process of converting the editor parameter containing the three parameters into the running parameter containing the five parameters.

Optionally, the component corresponds to a plug-in system. The plug-in system is established based on the ECS architecture, refers to a system under the ECS architecture, and is used for processing data of the component. Optionally, the plug-in system includes an identifier of the component, so as to establish a corresponding relationship between the plug-in system and the component. In some embodiments, the identifier of the component is a globally unique identifier (GUID). The plug-in system may provide the function of converting the parameter of its corresponding component, and the computer device can call the plug-in system corresponding to the component of the instance through the game scene editor to realize the conversion of the editor parameter in the component, so as to obtain the running parameter of the component.

The game editor may perform a conversion from an editor parameter to a running parameter for each component of the instance, or perform a conversion from editor parameters to running parameters for part of components of the instance.

In S306, the instance is run through the game engine based on the component and the running parameter.

In response to running (rendering) the instance, the game engine can use the component corresponding to the instance and the running parameter converted from the editor parameter. Optionally, the running parameter is synchronized to the game engine through the game scene editor.

In summary, the method provided by the embodiment realizes a data processing logic for parameter conversion in the game scene editor by converting the editor parameter of the component into the running parameter through the game scene editor, and achieves the effect that all data processing logics related to the instance are placed on the game scene editor's side. The game engine does not need to take into account the data processing logic in the game engine that is related to the actors while running, and is decoupled from the relevant data processing logic of the game scene editor, such that the overall processing logic is lighter and cleaner, the overall running architecture is tidier, the maintenance of the data processing logic in the game engine is avoided, and the complexity of maintaining the data processing logics is reduced.

Figure 4:
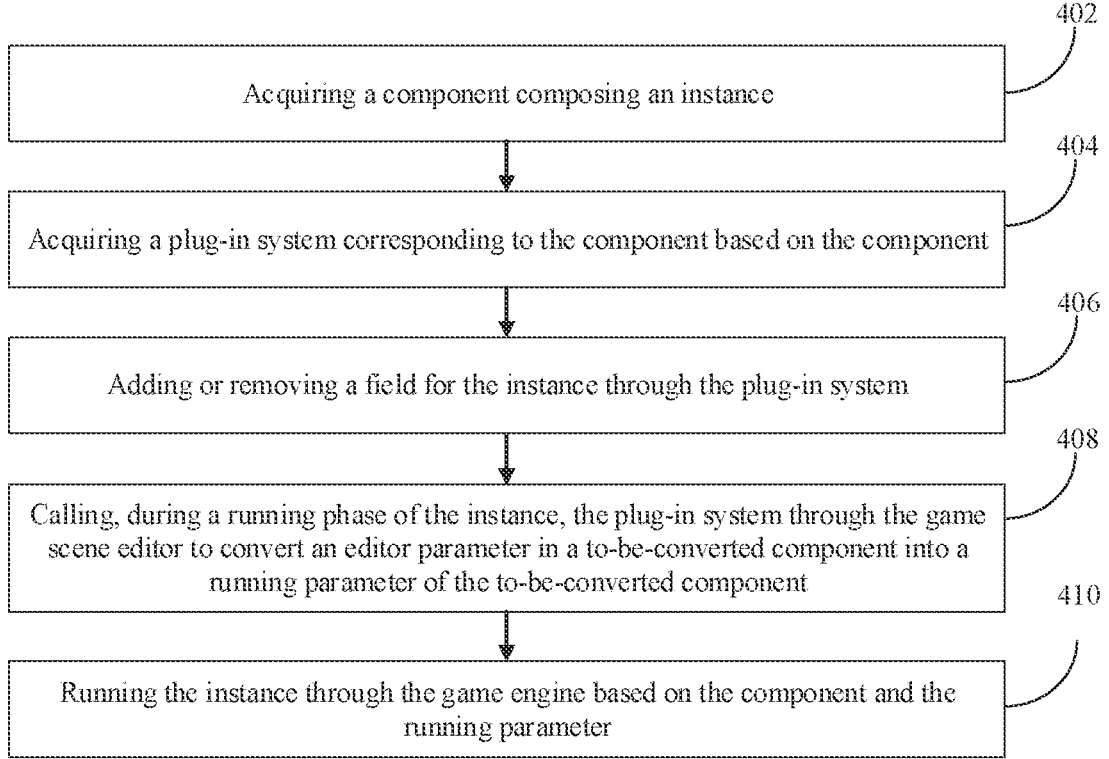
FIG. 4 shows a flowchart of a method for running an instance according to some embodiments of the present disclosure.

FIG. 4 shows a flowchart of a method for running an instance according to some embodiments of the present disclosure. The method may be applied to a computer device. In some embodiments, the computer device is a notebook computer, a handset, a tablet computer, a server, or other terminals. As shown in FIG. 4, the method includes the following processes.

In S402, a component composing an instance is acquired.

The component is established based on an ECS architecture, and refers to a component under the ECS architecture. The instance is an edited unit in a game scene editor, for example, the instance is the minimum edited unit in the game scene editor, such as an actor in the game scene editor. Optionally, the instance may also be referred to as an entity under the ECS architecture.

In some embodiments, the instance includes a virtual role in a virtual environment of a game, a virtual object composing the virtual environment, and the like. The game scene editor is used for editing a virtual environment provided by an application program, such as an editor that is used for editing game scenes (levels) of the game in a game development process.

The computer device can acquire the component by acquiring a class of the component. The class of the component includes codes for defining the component. Optionally, the class of the component is written by a developer.

Figure 5:
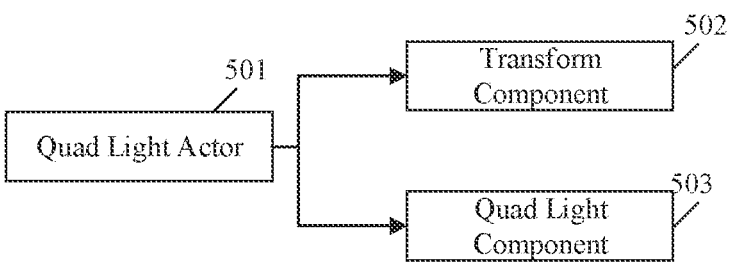
FIG. 5 shows a schematic diagram of an instance according to some embodiments of the present disclosure.

In some embodiments, FIG. 5 shows a schematic diagram of an instance according to some embodiments of the present disclosure. As shown in FIG. 5, a quad light actor 501 consists of a transform component 502 and a quad light component 503.

The transform component 502 may be established through a class of the transform component 502. In some embodiments, a code of the class of the transform component 502 is written as follows:

```
class TransformComponent
{
    GUID m_guid;
    EditorPose3D m_pose;
    bool m_is_visible;
    bool m_is_selected;
}
``` wherein the transform component 502 established based on the above code contains some common fields of different actors.

The quad light component 503 may be established through a class of the quad light component 503. In some embodiments, a code of the class of the quad light component 503 is written as follows:

```
class QuadLightComponent
{
    Int m_id;
    GUID m_guid;
    float m_light_intensity;
    ColorValue m_light_color;
    float m_width;
    float m_height;
}
``` wherein the quad light component 503 established based on the above code contains a unique field of the quad light actor 501. m_id is used for reflecting the actor to which the quad light component 503 belongs, and the m_id is unique.

It should be noted that the number and content of the components composing the actor are set by the developer according to the fields of the actor.

In S404, a plug-in system corresponding to the component is acquired based on the component.

The plug-in system is established based on the ECS architecture, refers to a system under the ECS architecture, and is used for processing data of the component. Optionally, the plug-in system includes an identifier of the component, such that a corresponding relationship is established between the plug-in system and the component. In some embodiments, the identifier of the component is a GUID.

The computer device needs to acquire the plug-in system corresponding to the component in the case that it needs to process the data of the component, such as to edit the instance composed of the component, or to run the instance composed of the component. Optionally, the computer device may acquire a plug-in system class corresponding to the component according to the identifier of the component composing the instance, and then acquire the plug-in system corresponding to the component according to the plug-in system class. The plug-in system class includes a code for defining the plug-in system. Optionally, the plug-in system class is written by the developer based on a processing manner required for the data of the component.

In some embodiments, the code of the plug-in system class is written as follows:

```
class QuadLightSystem
    :public IBaseSystem
{
    int addComponent(GUID guid,Pose3D pose);
    void removeComponent(Int id)
    static QuadLightSystem*getInstance0;
    void tick(float delta_time);
}
``` wherein the plug-in system class includes the GUID of its corresponding component and a unique ID of the instance to which the component belongs, such that the corresponding relationship is established between the plug-in system and the component; and the plug-in system can determine the instance to which the component belongs through the ID.

In S406, a field is added or removed for the instance through the plug-in system.

The above component is used for indicating a field of the instance. In some embodiments, the plug-in system corresponding to the component is used for adding the component to the instance. For example, addComponent( ) in the above-mentioned plug-in system class defines this function. The computer device adds a first component to the component composing the instance through the plug-in system in response to the operation of adding a first field to the instance, thereby adding the first field to the instance, wherein the first component is a component corresponding to the first field among the components corresponding to the plug-in system.

In some embodiments, the plug-in system corresponding to the component can also be used for removing a component from the instance. For example, removeComponent( ) in the above plug-in system class defines this function. The computer device removes a second component from the components composing the instance through the plug-in system in response to the operation of removing a second field from the instance, thereby removing the second field from the instance, wherein the second component is a component corresponding to the second field among the components corresponding to the plug-in system.

It should be noted that for the components of the instance, the computer device registers the components corresponding to the plug-in system for the instance through the plug-in system, such that the components of the instance can be obtained. Optionally, the instance is also defined by a class. In some embodiments, a code for defining the class of the instance is written as follows:

```
class EntityActor
{
    TransformComponent m_transform_component;
    std::map<class IBaseSystem*,std::vector<int>>m_component_map;
}
```

With the above code, the defined instance (EntityActor) composed of the components may be realized.

The computer device may add the components corresponding to the plug-in system to the defined instance or remove the components corresponding to the plug-in system from the defined instance through the plug-in system. In some embodiments, a code for registering (adding) the components for the instance is written as follows:

```
EntityActor actor;
. . .
int id=QuadLightSystem:getInstance( )->addComponent(guid,pose);
actor.m_component_map.insert(std::make_pair(QuadLightSystem::
getInstance( ),id));
```

With the above code, the components corresponding to the plug-in system QuadLightSystem may be registered for the instance EntityActor, such that adding the component TransformComponent and the component QuadLightComponent to the instance EntityActor through the plug-in system QuadLightSystem is realized to obtain the instance EntityActor composed of the components.

Figure 6:
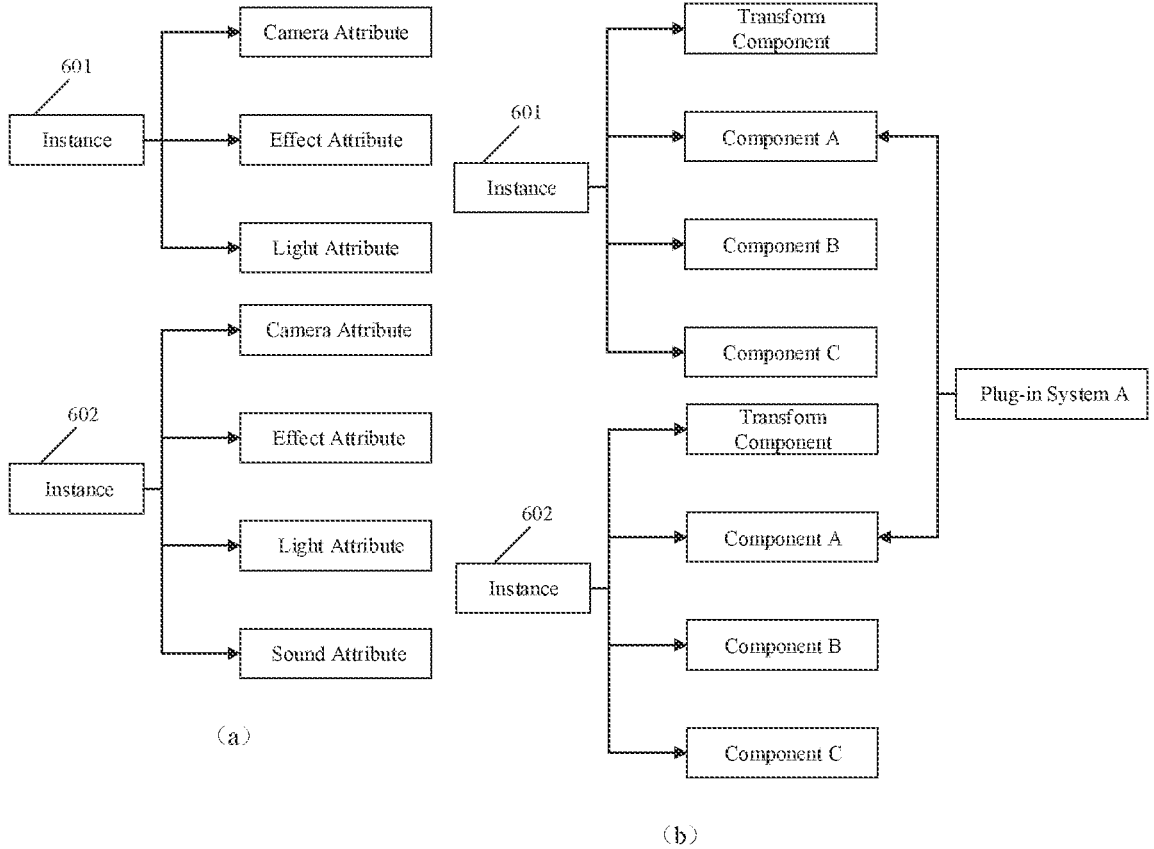
FIG. 6 shows a schematic diagram of components composing instances according to some embodiments of the present disclosure.

In some embodiments, FIG. 6 shows a schematic diagram of components composing instances according to some embodiments of the present disclosure. As shown in FIG. 6(*a*), it is necessary to write related fields corresponding to the instances during the definition of the instances in an OOP pattern. For example, the instance 601 includes a camera field, an effect field, and a light field, and the instance 602 includes a camera field, an effect field, a light field, and a sound field. It is necessary to modify corresponding codes of the instances in the case that the fields of the instances need to be modified, the process is complex, and the fields cannot be dynamically added to or removed from the instances.

As shown in FIG. 6(*b*), the instance 601 and the instance 602 are composed of components. In the case that fields of the instances need to be removed, for example, fields provided by components A, the fields provided by the components A can be removed through a plug-in system A corresponding to the components A. The plug-in system A corresponding to the components A may also add the fields provided by components A to the instance 601 or the instance 602 as needed.

In S408, during a running phase of the instance, the plug-in system is called through the game scene editor to convert an editor parameter in a to-be-converted component into a running parameter of the to-be-converted component.

The running phase of the instance may also be referred to as runtime. The converting process is determined according to a data structure of the parameters used by the game engine in the case of running the instance. The to-be-converted component is a component composing the instance, for example, the to-be-converted component includes any of the components composing the instance. Optionally, data structures of the editor parameter in the to-be-converted component and of parameters used by the game engine in the case of running the instance are defined by the developer of the game. The editor parameter in the to-be-converted component is defined in a class of the to-be-converted component. The plug-in system may also provide a function of parameter conversion of its corresponding component, for example, void tick( ) in the above plug-in system class defines this function.

In some embodiments, continuing to refer to the examples of FIG. 5, an EditorPose3D class is defined in a class of the transform component, an EulerRotation class is defined in the EditorPose3D class, and the EditorPose3D class and the EulerRotation class are encapsulated classes through which the position information of the instance in the virtual environment can be reflected. A code is written as follows:

```
class EditorPose3D
{
    Vector3 m_position;
    EulerRotation m_euler_rotation;
    Vector3 m_scale;
}
class EulerRotation
{
    Angle m_angle_yaw;
    Angle m_angle_pitch;
    Angle m_angle_row;
}
``` wherein the EditorPose3D class is used for providing the editor parameter and a data structure of the editor parameter, and the editor parameter is used for describing 3D position information of the instance in the virtual environment. It can be seen that for a specific data structure (defined by the EulerRotation class), the editor parameter may record the Euler data of rotation information of the instance, i.e. Euler angles in three directions of the instance. For an operator, the data structure (Euler angle) that provides such an editor parameter is more friendly for the editing operation.

In some embodiments, the data structure defining the running parameter of the instance QuadLightActor running in the game engine may be implemented by the following code:

```
class RenderQuadLight
{
    GUID m_guid;
    RuntimePose3D m_pos;
    float m_light_intensity;
    ColorValue m_light_color;
    DynamicArray<std::vector3>m_quad_light_points;
}
``` wherein a RuntimePose3D class is defined in the instance QuadLightActor, and the RuntimePose3D class is used for defining the data structure of the running parameter of a 3D position of the instance running in the game engine. A code is written as follows:

```
class RuntimePose3D
{
    Vector3 m_position;
    Quaternion m_rotation;
    Vector3 m_scale;
}
``` wherein RuntimePose3D is a running parameter corresponding to the editor parameter EditorPose3D. It can be seen that the recorded rotation information of the instance in the data structure of the running parameter is recorded by a quaternion. This is because the quaternion has an absolute advantage in drawing, calculation, and other aspects and thus can improve the running efficiency of the game engine.

Optionally, the plug-in system performs the function of converting the parameters of its corresponding components through a processing function. The processing function is defined in the plug-in system, such as a tick function. The plug-in system may be called by the game scene editor to implement the conversion of the editor parameter in the to-be-converted component to obtain the running parameter of the to-be-converted component.

In some embodiments, the tick function (also referred to as a tick logic) of the plug-in system may be implemented by the following code:

```
void QuadLightSystem:tick(float delta_time)
{
    for(auto quad_light_component:quad_light_component_map)
    {
        //get the QuadLightPtr from the Render level
        RenderSystem*render_system=g_global_context.getRenderSystem0;
        RenderQuadLight*render_quad_light=render_system->
        getRenderQuadLightPtr(quad_light_component.m_guid);
        //transfer the editor pos to the runtime pos
        TransformComponent& transform_component=
    g_actor_map(quad_light_component.m_id);
        RuntimePose3D runtime_pose;
        runtime_pose.m_position = transform_component.
        m_pose.m_position;
        runtime_pose.m_scale = transform_component. m_pose. m_scale;
        EulerRotation editor_euler_rotation = transform_component.
        m_pose.m_euler_rotation;
        double cos_yaw = cos(editor_euler_rotation . m_yaw *0.5);
        double sin_yaw = sin(editor_euler_rotation . m_yaw *0.5);
        double cos_pitch = cos(editor_euler_rotation . m_pitch*0.5);
        double sin_pitch = sin(editor_euler_rotation . m_pitch*0.5);
        double cos_roll = cos(editor_euler_rotation . m_roll*0.5);
```

-continued

```
        double sin_roll = cos(editor_euler_rotation . m_roll*0.5);
        runtime_pos.m_rotation.w= cos_yaw*cos_pitch*cos_roll +
            sin_yaw* sin_pitch* sin_roll;
        runtime_pos.m_rotation.x= cos_yaw*cos_pitch*sin_roll –
            sin_yaw* sin_pitch* cos_roll;
        runtime_pos.m_rotation.y= sin_yaw*cos_pitch*sin_roll +
            cos_yaw* sin_pitch* cos_roll;
        runtime_pos.m_rotation.z= sin_yaw*cos_pitch*cos_roll –
            cos_yaw* sin_pitch* sin_roll;
        //calculates the world position of four points based on the quad
    light width and height,
        //as well as their own center point position and rotation.
        //data structure transformation
        render_quad_light->m_light_color=
        quad_light_component.m_light_color;
        render_quad_light->m_light_intensity=
        quad_light_component.m_light_intensity;
        render_quad_light->m_pos = runtime_pose;
    ...
    }
    }
    }
``` wherein the "transfer the editor pos to the runtime pos" section of the code is an implementation process of parameter conversion by a system plug-in, and specifically a process of converting an editor 3D position into a runtime 3D position. Since in the data structure of the editor parameter, the rotation information in the position information of the instance is recorded by the Euler angles, while the running parameter is recorded by the quaternion, the Euler angles can be converted into the quaternion by executing a conversion logic provided by a function defined by this section of the code, thus converting EditorPos3D data into RuntimePose3D data.

The "data structure conversion" section of the code defines a process of parameter synchronization. This section refers to synchronously converting a data structure used in editing the instance into a data structure used in running the instance. Data of the same type of parameters (that is, the data structure of the editor parameter is consistent with that of the running parameter) can be assigned directly, while data of different types of parameters (that is, the data structure of the editor parameter is inconsistent with that of the running parameter) is converted as above and then synchronized. In this section, the RuntimePose3D data obtained through conversion can be synchronized into data used by the game engine in the case of running the instance.

For the above parameter conversion process, the editor parameter in the to-be-converted component is converted by the game scene editor according to a logical mapping relationship between the editor parameter in the to-be-converted component and the running parameter of the to-be-converted component to obtain the running parameter of the to-be-converted component. The logical mapping relationship is determined based on the editor parameter in the to-be-converted component and the data structure used by the game engine in the case of running the instance. It should be noted that the editor parameters and corresponding running parameters of different components may be different, and the logical mapping relationship is determined by the developer according to the specific editor parameter and the corresponding running parameter. Optionally, the logical mapping relationship is defined and implemented by codes.

In S410, the instance is run through the game engine based on the component and the running parameter.

In response to running (rendering) the instance, the game engine may use the component corresponding to the instance and the running parameter converted from the editor parameter. Optionally, the running parameter is synchronized to the game engine through the game scene editor.

Furthermore, after the instance is established, an icon of the established instance may be displayed in a panel of a user interface of the game scene editor as shown in FIG. 1. At this time, the icon representing the instance is displayed in the user interface of the game scene editor, and a virtual environment that the game scene editor is responsible for editing may also be displayed in the game scene editor. In response to a drag operation for the icon representing the instance, the computer device may display the instance represented by the icon in the virtual environment through the game scene editor. The drag operation is an operation of dragging the icon representing the instance into the displayed virtual environment in the user interface.

Figures 7, 8:
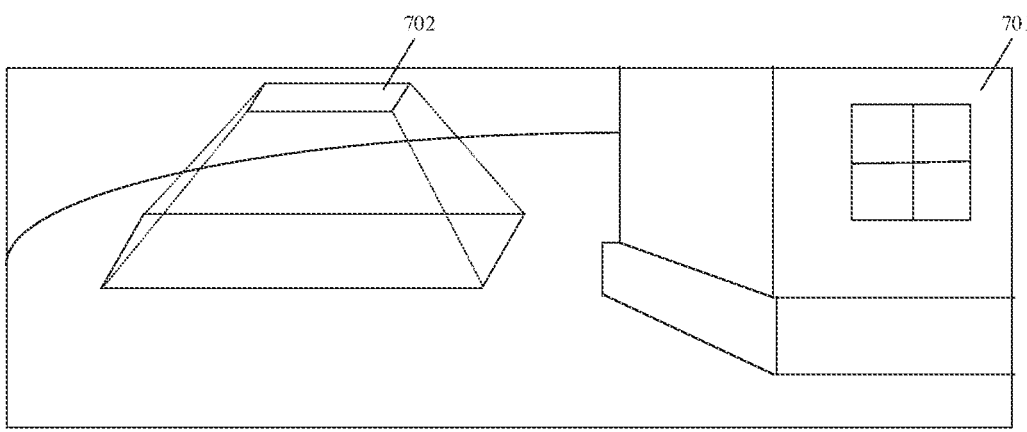
FIG. 7 is a schematic diagram of a virtual environment according to some embodiments of the present disclosure.
FIG. 8 shows a schematic diagram of editing an editor parameter according to some embodiments of the present disclosure.

In some embodiments, FIG. 7 shows a schematic diagram of a virtual environment according to some embodiments of the present disclosure. As shown in FIG. 7, after receiving a drag operation of dragging an icon of a quad light actor to a virtual environment 701 displayed in the game scene editor, the computer device may display the quad light actor 702 in the virtual environment 701 through the game scene editor.

Optionally, the game scene editor may also display the editor parameter of the component of the instance in a panel used for editing the instance. In some embodiments, FIG. 8 shows a schematic diagram of editing an editor parameter according to some embodiments of the present disclosure. As shown in FIG. 8, parameters (such as position, rotation, and scale) of general fields provided by the component TransformComponent and parameters (such as width, height, color, intensity, etc.) of unique fields provided by the component QuadLightComponent are displayed in an editing panel 801, and the parameters provided by the component TransformComponent and the component QuadLightComponent may be edited by the editing panel 801. All the above parameters are editor parameters.

It should be noted that the method provided by the embodiments of the present disclosure can provide the following effects.

(1) The scalability is improved.

Scalability is a design concept. On the basis of the architecture or design of the related art, in the case that certain aspects of the instance change, the method provided by the embodiments of the present disclosure can adapt to these changes with the minimum modification, that is, by changing the fields of the instance through the components. In this process, a required code is modified slightly, and the adaptability to the changes of the instance is better, such that the above-described design has better scalability. With the above-described design, the method can accommodate uncertain changes to the components in the future.

The method provided by the embodiment can separate technical data from operations. Only data is stored in the components, and only operations of the same class of components are stored in the systems. A new class of actors can be added just by adding components and systems without modifying the original actors. That is, the code does not need to be rewritten in the case that the requirement changes. A partial modification of the code does not cause large-scale changes. New functions and new modules can be easily introduced.

(2) The logics of the game scene editor and the game engine are separated in the case that the game scene editor and the game engine run.

Due to the need to provide friendly human-machine interaction at the time of editing the instances through the game scene editor, it is necessary to provide editor parameters that are more in line with the user's sense and easier to understand. However, since the game engine is more concerned with the operational performance and memory read speed at runtime, it is necessary to provide a more efficient data structure. Therefore, it is necessary to convert the editor parameters into data that is available at runtime.

According to the method provided by the embodiments, the system running the instance is encapsulated by the ECS, the component provides the user-friendly editor parameter, and the system completes the translation and synchronization of the component to the runtime data structure. The effect that all data processing logics related to the instance are placed on the game scene editor's side is achieved, the game engine does not need to take into account the logics related to the game scene editor at runtime, the overall logic is lighter and cleaner, and the overall architecture is tidier.

In summary, the method provided by the embodiments realizes a data processing logic for parameter transformation in the game scene editor by converting the editor parameter of the component into the running parameter through the game scene editor, and achieves the effect that all data processing logics related to the instance are placed on the game scene editor's side. The game engine does not need to take into account the data processing logic in the game engine that is related to the actors while running, and is decoupled from the relevant data processing logic of the game scene editor, so that the overall processing logic is lighter and cleaner, the overall running architecture is tidier, the maintenance of the data processing logic in the game engine is avoided, and the complexity of maintaining the data processing logics is reduced.

Furthermore, the instances are composed of the components under the ECS architecture, such that the addition or removal of fields for the instances can be realized by adding or removing the components without modifying the codes of the instances. And since the fields provided by the components are stored continuously in a memory, the performance is improved.

Based on the contents of the above-described embodiments, a process of constructing an instance and editing an instance field is described in detail by the following embodiments. FIG. 9 shows a flowchart of a method for editing an instance according to some embodiments of the present disclosure. The method may be applied to a computer device. In some embodiments, the computer device is a notebook computer, a handset, a tablet computer, a server, or other terminals. As shown in FIG. 9, the method includes the following processes.

In S902, a component in a game scene editor is acquired.

The component is established based on an ECS architecture, and refers to a component under the ECS architecture. The computer device can acquire the component by acquiring a class of the component. The class of the component includes codes for defining the component. Optionally, the class of the component is written by a developer.

The component may be loaded by the game scene editor and may be considered as being defined in the game scene editor. The game scene editor is used for editing a virtual environment provided by an application program, such as an editor that is used for editing a game scene (level) of a game in a game development process.

In S904, in response to a registration operation, a component composing the instance is acquired by registering the component for the instance.

The instance is an edited unit in the game scene editor, for example, the instance is the minimum edited unit in the game scene editor. In some embodiments, the instance includes a virtual role in a virtual environment of the game, a virtual object composing the virtual environment, and the like. The component registered in the instance by the computer device is a component composing the instance. The above-mentioned process of registering the component is triggered by the registration operation on the instance, and the registration operation may be performed in the game scene editor by a user, that is, the registration operation is triggered in the game scene editor.

At the time of initializing the instance, the computer device needs to register the component composing the instance for the instance, such that the instance can have a field or function provided by the component. Optionally, the component corresponds to a plug-in system. The plug-in system is established based on the ECS architecture, refers to a system under the ECS architecture, and is used for processing data of the component. Optionally, the plug-in system includes an identifier of the component, and a corresponding relationship can be established between the plug-in system and the component through the identifier.

The computer device needs to acquire the plug-in system corresponding to the component in the case that it needs to process the data of the component, such as to register the component for the instance, to edit the instance composed of the component, or to run the instance composed of the component. Optionally, the computer device may acquire a plug-in system class corresponding to the component according to the identifier of the component composing the instance, and then acquire the plug-in system based on the plug-in system class. The plug-in system class includes codes for defining the plug-in system. Optionally, the plug-in system class is written by the developer based on a processing manner required for the data of the component. In response to registering the component for the instance, the computer device may register the component for the instance through the plug-in system corresponding to the component, and thus can obtain the component composing the instance.

In S906, in response to an edit operation on the instance, a component is added to or deleted from the components composing the instance.

The edit operation is an editing operation performed on the instance by the user, for example, the operation of adding or deleting a field for the component. The edit operation may be performed in the game scene editor, that is, the edit operation is triggered in the game scene editor. Optionally, the component is used for reflecting the field of the instance, and the plug-in system corresponding to the component is used for adding or removing the component for the instance.

In some embodiments, in response to the operation of adding a first field to the instance, the computer device adds a first component corresponding to a plug-in system to the components composing the instance through the plug-in system, thereby implementing the addition of the first field to the instance, wherein the first component is a component corresponding to the first field.

In some embodiments, in response to the operation of removing a second field from the instance, the computer device removes a second component from the components composing the instance through a plug-in system, thereby implementing the removal of the second field from the instance, wherein the second component is a component corresponding to the second field.

It should be noted that during a running phase of the instance, the computer device may convert the running parameters of the components of the instance through the game scene editor according to the method shown in FIG. 3 or FIG. 4, thereby obtaining the running parameters of the components. Thereafter, the instance is run by the game engine based on the components and the running parameters. The specific process may refer to the foregoing embodiments, and will not be described in detail here.

In summary, in the method provided by the embodiments, the instance is composed by using the components under the ECS architecture, and can edit the instance by adding or removing the components for the instance without modifying the code of the instance, thereby improving the efficiency of instance editing. In addition, since the components are stored continuously in a memory, the performance is improved.

FIG. 10 shows a flowchart of an instance editing method according to some embodiments of the present disclosure. The method may be applied to a computer device. In some embodiments, the computer device is a notebook computer, a handset, a tablet computer, a server, or other terminals. As shown in FIG. 10, the method includes the following processes.

In S1002, a component in a game scene editor is acquired.

The component is established based on an ECS architecture, and refers to a component under the ECS architecture. The computer device may acquire the component by acquiring a class of the component. The component may be loaded by the computer device, and the game scene editor is an editor that is used for editing game scenes (levels) of a game in a game development process.

In S1004, a component composing the instance is acquired by registering a component corresponding to a plug-in system for an instance through the plug-in system.

The instance is an edited unit in the game scene editor, for example, the instance is the minimum edited unit in the game scene editor. In some embodiments, the instance includes a virtual role in a virtual environment of the game, a virtual object composing the virtual environment, and the like. At the time of initializing the instance, the computer device needs to register the component composing the instance for the instance, such that the instance can have a field or function provided by the component. Optionally, the component corresponds to the plug-in system. The plug-in system is established based on the ECS architecture, refers to a system under the ECS architecture, and is used for processing data of the component. Optionally, the plug-in system includes an identifier of the component, and a corresponding relationship may be established between the plug-in system and the component through the identifier.

The computer device needs to acquire the plug-in system corresponding to the component in the case that it needs to register the component for the instance. Optionally, the computer device may acquire a plug-in system class corresponding to the component according to the identifier of the component composing the instance, and then acquire the plug-in system according to the plug-in system class. In response to registering the component for the instance, the computer device may register the component for the instance through the plug-in system corresponding to the component, and thus can obtain the component composing the instance.

In some embodiments, continuing to refer to FIG. 5, the computer device registers a transform component and a quad light component for a quad light actor, and thus can provide corresponding fields (functions) for the quad light actor through the transform component and the quad light component.

In S1006, in response to an operation of adding a first field for the instance, a first component is added to the components composing the instance through the plug-in system.

The operation of adding the first field to the instance is an edit operation performed on the instance by a user. The components composing the instance are used for indicating the fields of the instance, wherein each component may provide one or more fields for the instance. The first component is a component corresponding to the first field. The computer device can add the first field to the instance by adding the first component to the instance through the plug-in system corresponding to the first component.

In S1008, in response to an operation of removing a second field for the instance, a second component is removed from the components composing the instance through the plug-in system.

The operation of removing the second field from the instance is an edit operation performed on the instance by the user. The components composing the instance are used for indicating the fields of the instance, wherein each component may provide one or more fields for the instance. The second component is a component corresponding to the second field. The computer device may remove (delete) the second field from the instance by removing the second component from the instance through the plug-in system corresponding to the second component.

In some embodiments, continuing to refer to FIG. 6(*b*), after receiving an operation of removing a field provided by a component A from an instance 601, the computer device removes the component A from components composing the instance 601 through a plug-in system A, thus implementing the removal of the field provided by the component A from the instance 601.

It should be noted that during a running phase of the instance, the computer device may convert running parameters of the components of the instance through the game scene editor according to the method shown in FIG. 3 or FIG. 4, thereby obtaining the running parameters of the components. Thereafter, the instance is run by the game engine based on the components and the running parameters. The specific process may refer to the foregoing embodiments, and will not be described in detail here.

In summary, the method provided by the embodiments composes the instance by using the components under the ECS architecture, and can realize dynamic addition or removal of the fields for the instance by adding or removing the components for the instance without modifying the code of the instance, thereby improving the efficiency of instance editing. And since the fields provided by the components are stored continuously in a memory, the performance is improved.

It should be noted that the sequence of the processes of the method provided by the embodiments of the present disclosure can be adjusted appropriately, and the number of the processes can also be increased or decreased correspondingly according to the situation. Any modifications that can be readily conceived by a person skilled in the art within the technical scope disclosed by the present disclosure should be included within the scope of protection of the present disclosure, and thus will not be described in detail again.

Figure 11:
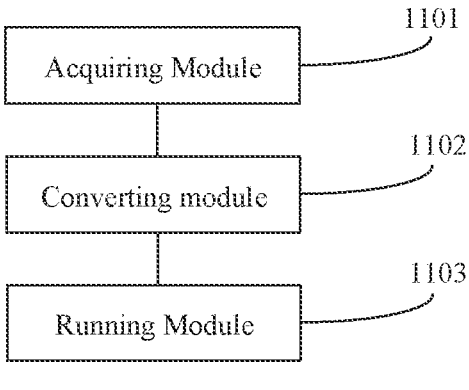
FIG. 11 shows a structure diagram of an apparatus for running an instance according to some embodiments of the present disclosure.

FIG. 11 shows a structure diagram of an apparatus for running an instance according to some embodiments of the present disclosure. As shown in FIG. 11, the device includes:

an acquiring module 1101 configured to acquire a component composing an instance, wherein the component is established based on an ECS architecture, and the instance is an edited unit in a game scene editor, the game scene editor being configured to edit a virtual environment provided by an application program;

a converting module 1102 configured to acquire, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and a running module 1103 configured to run the instance through the game engine based on the component and the running parameter.

In some embodiments, the converting module 1102 is configured to acquire, according to a logical mapping relationship between an editor parameter in a to-be-converted component and a running parameter of the to-be-converted component, the running parameter of the to-be-converted component by converting the editor parameter in the to-be-converted component through the game scene editor, wherein the logical mapping relationship is determined based on the editor parameter in the to-be-converted component and the data structure; and the to-be-converted component is a component composing the instance.

In some embodiments, the converting module 1102 is configured to acquire, by calling a plug-in system through the game scene editor to convert the editor parameter in the to-be-converted component, wherein the plug-in system is configured to process data of the to-be-converted component and is established based on the ECS architecture.

In some embodiments, a processing function is defined in the plug-in system; and the converting module 1102 is configured to acquire, by calling the plug-in system through the game scene editor to run the processing function to convert the editor parameter in the to-be-converted component, the running parameter of the to-be-converted component.

Figure 12:
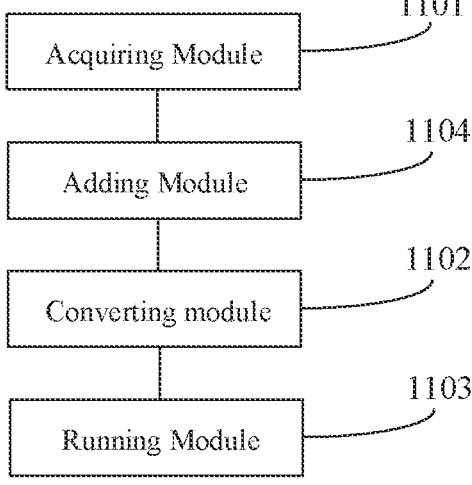
FIG. 12 shows a structure diagram of an apparatus for running an instance according to some embodiments of the present disclosure.

In some embodiments, the component is configured to indicate a field of the instance, and the plug-in system is further configured to add a component for the instance. As shown in FIG. 12, the apparatus further includes an adding module 1104, wherein the adding module 1104 is configured to add, in response to an operation of adding a first field for the instance, a first component to the component composing the instance through the plug-in system, wherein the first component is a component corresponding to the first field.

Figures 13, 14:
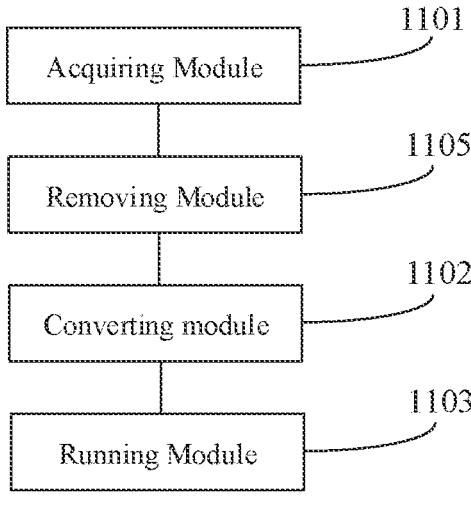
FIG. 13 shows a structure diagram of an apparatus for running an instance according to some embodiments of the present disclosure.
FIG. 14 shows a structure diagram of an apparatus for running an instance according to some embodiments of the present disclosure.

In some embodiments, the component is configured to indicate a field of the instance, and the plug-in system is further configured to remove a component for the instance. As shown in FIG. 13, the apparatus further includes a removing module 1105, wherein the removing module 1105 is configured to remove, in response to an operation of removing a second field for the instance, a second component from the component composing the instance through the plug-in system, wherein the second component is a component corresponding to the second field.

In some embodiments, as shown in FIG. 14, the apparatus further includes a registering module 1106, wherein registering module 1106 is configured to acquire, by registering a component corresponding to the plug-in system for the instance through the plug-in system, the component composing the instance.

In some embodiments, the acquiring module 1101 is further configured to acquire a plug-in system class corresponding to the component according to an identifier of the component composing the instance; and acquire the plug-in system based on the plug-in system class.

Figure 15:
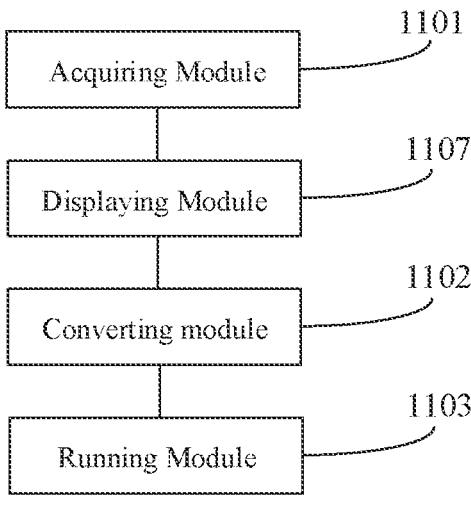
FIG. 15 shows a structure diagram of an apparatus for running an instance according to some embodiments of the present disclosure.

In some embodiments, an icon representing the instance and the virtual environment are displayed in a user interface of the game scene editor. As shown in FIG. 15, the apparatus further includes a displaying module 1107, wherein the displaying module 1107 is configured to display, in response to a drag operation on the icon, the instance in the virtual environment, wherein the drag operation is an operation of dragging the icon into the virtual environment in the user interface.

For the apparatus for running the instance provided by the above-described embodiments, the specific way in which each module operates has been described in detail in the embodiments of the related methods, and thus will not be described in detail herein.

Figure 16:
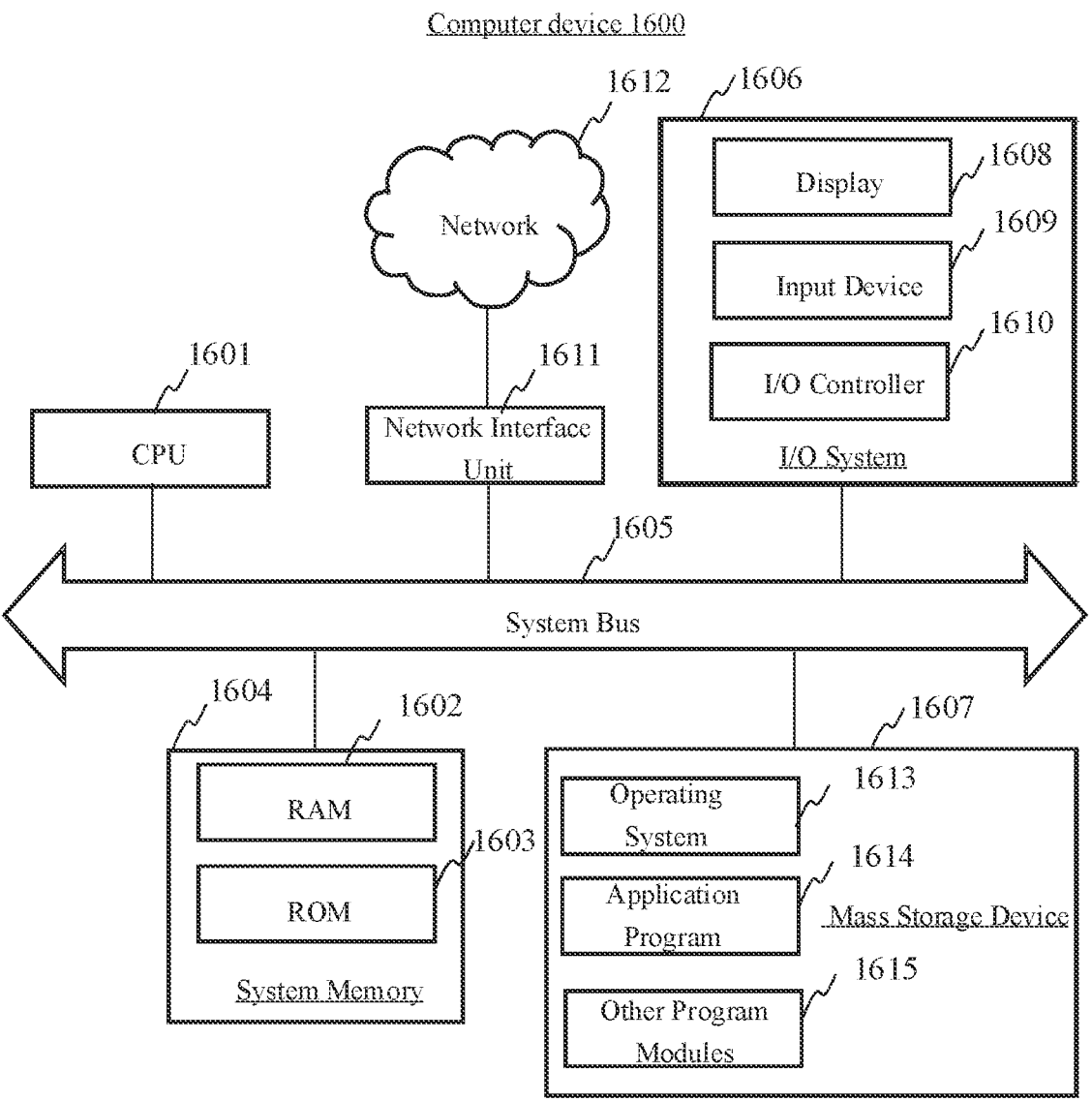
FIG. 16 shows a structure diagram of a computer device according to some embodiments of the present disclosure.

FIG. 16 shows a structure diagram of a computer device according to some embodiments of the present disclosure. In some embodiments, a computer device 1600 includes a desktop computer, a laptop, a tablet computer, a smart phone, a server, or other terminals. The computer device 1600 may also be referred to as user equipment, a portable terminal, a laptop terminal, a desktop terminal, or the like.

The computer device 1600 includes a central processing unit (CPU) 1601, a system memory 1064, and a system bus 1065, wherein the system memory 1064 includes a random access memory (RAM) 1602 and a read-only memory (ROM) 1603, and the system bus 1065 is connected with the system memory 1064 and the CPU 1061. The computer device 1600 further includes a basic input/output (I/O) system 1606 and a mass storage device 1607, wherein the basic I/O system 1606 helps in transmitting information among various devices in the computer device, and the mass storage device 1607 is used for storing an operating system 1613, an application program 1614, and other program modules 1615.

The basic I/O system 1606 includes a display 1608 used for displaying information and an input device 1609 (such as a mouse or a keyboard) used by a user to input information. Both the display 1608 and the input device 1609 are connected to the CPU 1601 via an I/O controller 1610 connected to the system bus 1605. The basic I/O system 1606 may further include the I/O controller 1610 to receive and process input from a plurality of other devices such as the keyboard, the mouse, or an electronic stylus. Similarly, the I/O controller 1610 further provides output to a display screen, a printer, or other types of output devices.

The mass storage device 1607 is connected to the CPU 1601 via a mass storage controller (not shown) connected to the system bus 1605. The mass storage device 1607 and an associated computer-readable storage medium provide non-transitory storage for the computer device 1600. That is, the mass storage device 1607 may further include a computer-readable storage medium (not shown) such as a hard disc or a compact disc read-only memory (CD-ROM).

Without loss of generality, the computer-readable storage medium may include a computer storage medium and a communication medium. The computer storage medium includes volatile and non-volatile, removable and non-removable media implemented by any method or technology for storing information such as computer-readable storage instructions, data structures, program modules, or other data.

The computer storage medium includes a RAM, a ROM, an erasable programmable read-only memory (EPROM), an electrically-erasable programmable read-only memory (EE-PROM), a flash memory or other solid-state storage devices, a CD-ROM, a digital versatile disc (DVD) or other optical storage, a cassette, magnetic tape, magnetic disk storage or other magnetic storage devices. In addition, a person skilled in the art can appreciate that the computer storage medium is not limited to the above-mentioned types. The system memory 1604 and the mass storage device 1607 may be collectively referred to as a memory.

The memory stores one or more programs; the one or more programs are configured to be executed by one or more CPUs 1601, and contain instructions for performing the above-described method embodiments; and the one or more CPUs 1601 execute the one or more programs to perform the methods provided by the above-described method embodiments.

According to the embodiments of the present disclosure, the computer device 1600 may further be connected via a network (such as the Internet) to a remote computer device on the network to run. That is, the computer device 1600 may be connected to a network 1612 via a network interface unit 1611 connected to the system bus 1605, or may be connected to other types of networks or remote computer device systems (not shown) via the network interface unit 1611.

The memory further includes one or more programs, wherein the one or more programs are stored in the memory, and contain the processes performed by the computer device in the methods provided by the embodiments of the present disclosure.

In the embodiments of the present disclosure, a computer device is further provided. The computer device includes one or more processors and a memory for storing one or more instructions executable by the processors, wherein the one or more instructions, when loaded and executed by the processors, cause the processors to perform the methods in the above-described embodiments.

In the embodiments of the present application, a non-transitory computer-readable storage medium storing at least one instruction is further provided, such as a memory including at least one instruction. The at least one instruction, when executed by a processor of a computer device, causes the computer device to perform the method for running the instance in the above-described method embodiments. In some embodiments, the non-transitory computer-readable storage medium may be a ROM, a RAM, a CD-ROM, magnetic tape, a floppy disc, an optical data storage device, or the like.

In the embodiments of the present disclosure, a non-transitory computer-readable storage medium storing at least one instruction therein is further provided. The at least one instruction, when executed by a processor of a computer device, causes the computer device to perform the methods provided by the above-described embodiments.

In the embodiments of the present disclosure, a computer program product is further provided. The computer program product includes at least one computer program, wherein the at least one computer program, when executed by a processor, causes the processor to perform the methods provided by the above-described embodiments.

All the embodiments of the present disclosure may be executed separately or in combination with other embodiments, which is considered within the scope of protection of the present disclosure.

What is claimed is:

1. A method for running an instance, comprising:

acquiring a component composing the instance, wherein the component is established based on an entity-component-system (ECS) architecture, and the instance is an edited unit in a game scene editor, the game scene editor being configured to edit a virtual environment provided by an application program;

acquiring, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and running the instance through the game engine based on the component and the running parameter:

wherein acquiring the running parameter of the component by converting the editor parameter in the component through the game scene editor comprises: acquiring, according to a logical mapping relationship between an editor parameter in a to-be-converted component and a running parameter of the to-be-converted component, the running parameter of the to-be-converted component by converting the editor parameter in the to-be-converted component through the game scene editor, wherein the logical mapping relationship is determined based on the editor parameter in the to-be-converted component and the data structure, and the to-be-converted component is a component composing the instance; and wherein acquiring the running parameter of the to-be-converted component by converting the editor parameter in the to-be-converted component through the game scene editor comprises: acquiring, by calling a plug-in system through the game scene editor to convert the editor parameter in the to-be-converted component, the running parameter of the to-be-converted component, wherein the plug-in system is configured to process data of the to-be-converted component and is established based on the ECS architecture.

2. The method according to claim 1, wherein a processing function is defined in the plug-in system; and acquiring, by calling the plug-in system through the game scene editor to convert the editor parameter in the to-be-converted component, the running parameter of the to-be-converted component comprises:

acquiring, by calling the plug-in system through the game scene editor to run the processing function to convert the editor parameter in the to-be-converted component, the running parameter of the to-be-converted component.

3. The method according to claim 1, wherein the component is configured to indicate a field of the instance; the plug-in system is further configured to add a component for the instance; and the method further comprises:

adding, in response to an operation of adding a first field for the instance, a first component to the component composing the instance through the plug-in system, wherein the first component is a component corresponding to the first field.

4. The method according to claim 1, wherein the component is configured to indicate a field of the instance; the plug-in system is further configured to remove a component for the instance; and the method further comprises:

removing, in response to an operation of removing a second field for the instance, a second component from the component composing the instance through the plug-in system, wherein the second component is a component corresponding to the second field.

5. The method according to claim 1, further comprising:

acquiring, by registering a component corresponding to the plug-in system for the instance through the plug-in system, the component composing the instance.

6. The method according to claim 1, further comprising:

acquiring a plug-in system class corresponding to the component according to an identifier of the component composing the instance; and acquiring the plug-in system based on the plug-in system class.

7. The method according to claim 1, wherein an icon representing the instance and the virtual environment are displayed in a user interface of the game scene editor; and the method further comprises:

displaying, in response to a drag operation on the icon, the instance in the virtual environment, wherein the drag operation is an operation of dragging the icon into the virtual environment in the user interface.

8. A computer device, comprising:

one or more processors, and a memory for storing one or more instructions executable by the processors, wherein the one or more instructions, when loaded and executed by the processors, cause the processors to perform:

acquiring a component composing an instance, wherein the component is established based on an entity-component-system (ECS) architecture, and the instance is an edited unit in a game scene editor, the game scene editor being configured to edit a virtual environment provided by an application program;

acquiring, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and running the instance through the game engine based on the component and the running parameter;

wherein acquiring the running parameter of the component by converting the editor parameter in the component through the game scene editor comprises:

acquiring, according to a logical mapping relationship between an editor parameter in a to-be-converted component and a running parameter of the to-be-converted component, the running parameter of the to-be-converted component by converting the editor parameter in the to-be-converted component through the game scene editor, wherein the logical mapping relationship is determined based on the editor parameter in the to-be-converted component and the data structure, and the to-be-converted component is a component composing the instance; and wherein acquiring the running parameter of the to-be-converted component by converting the editor parameter in the to-be-converted component through the game scene editor comprises: acquiring, by calling a plug-in system through the game scene editor to convert the editor parameter in the to-be-converted component, the running parameter of the to-be-converted component, wherein the plug-in system is configured to process data of the to-be-converted component and is established based on the ECS architecture.

9. The computer device according to claim 8, wherein a processing function is defined in the plug-in system; and the one or more instructions, when loaded and executed by the processors, cause the processors to perform:

acquiring, by calling the plug-in system through the game scene editor to run the processing function to convert the editor parameter in the to-be-converted component, the running parameter of the to-be-converted component.

10. The computer device according to claim 8, wherein the component is configured to indicate a field of the instance; the plug-in system is further configured to add a component for the instance; and the one or more instructions, when loaded and executed by the processors, cause the processors to perform:

adding, in response to an operation of adding a first field for the instance, a first component to the component composing the instance through the plug-in system, wherein the first component is a component corresponding to the first field.

11. The computer device according to claim 8, wherein the component is configured to indicate a field of the instance; the plug-in system is further configured to remove a component for the instance; and the one or more instructions, when loaded and executed by the processors, cause the processors to perform:

removing, in response to an operation of removing a second field for the instance, a second component from the component composing the instance through the plug-in system, wherein the second component is a component corresponding to the second field.

12. The computer device according to claim 8, wherein the one or more instructions, when loaded and executed by the processors, cause the processors to perform:

acquiring, by registering a component corresponding to the plug-in system for the instance through the plug-in system, the component composing the instance.

13. The computer device according to claim 8, wherein the one or more instructions, when loaded and executed by the processors, cause the processors to perform:

acquiring a plug-in system class corresponding to the component according to an identifier of the component composing the instance; and acquiring the plug-in system based on the plug-in system class.

14. The computer device according to claim 8, wherein an icon representing the instance and the virtual environment are displayed in a user interface of the game scene editor; and the one or more instructions, when loaded and executed by the processors, cause the processors to perform:

displaying, in response to a drag operation on the icon, the instance in the virtual environment, wherein the drag operation is an operation of dragging the icon into the virtual environment in the user interface.

15. A non-transitory computer-readable storage medium storing at least one instruction therein, wherein the at least one instruction, when executed by a processor of a computer device, causes the computer device to perform:

acquiring a component composing an instance, wherein the component is established based on an entity-component-system (ECS) architecture, and the instance is an edited unit in a game scene editor, the game scene editor being configured to edit a virtual environment provided by an application program;

acquiring, during a running phase of the instance, a running parameter of the component by converting an editor parameter in the component through the game scene editor, wherein a process of the converting is determined according to a data structure of a parameter used by a game engine in a case of running the instance, and the editor parameter is a parameter configured to edit the component in the game scene editor; and running the instance through the game engine based on the component and the running parameter;

wherein acquiring the running parameter of the component by converting the editor parameter in the component through the game scene editor comprises: acquiring, according to a logical mapping relationship between an editor parameter in a to-be-converted component and a running parameter of the to-be-converted component, the running parameter of the to-be-converted component by converting the editor parameter in the to-be-converted component through the game scene editor, wherein the logical mapping relationship is determined based on the editor parameter in the to-be-converted component and the data structure, and the to-be-converted component is a component composing the instance; and wherein acquiring the running parameter of the to-be-converted component by converting the editor parameter in the to-be-converted component through the game scene editor comprises: acquiring, by calling a plug-in system through the game scene editor to convert the editor parameter in the to-be-converted component, the running parameter of the to-be-converted component, wherein the plug-in system is configured to process data of the to-be-converted component and is established based on the ECS architecture.

*  *  *  *  *